(12) United States Patent
Misikir et al.

(10) Patent No.: US 9,022,706 B2
(45) Date of Patent: May 5, 2015

(54) ENERGY ABSORBING FASTENING SYSTEM

(71) Applicants: Laike Misikir, Ann Arbor, MI (US); Clifford Edwin Lambarth, Portage, MI (US); Vishnu Mallapragada, Kalamazoo, MI (US); Alfred James Dacey, IV, Mendon, MI (US); Keith Buffinga, Hopkins, MI (US)

(72) Inventors: Laike Misikir, Ann Arbor, MI (US); Clifford Edwin Lambarth, Portage, MI (US); Vishnu Mallapragada, Kalamazoo, MI (US); Alfred James Dacey, IV, Mendon, MI (US); Keith Buffinga, Hopkins, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 13/712,303

(22) Filed: Dec. 12, 2012

(65) Prior Publication Data
US 2013/0149064 A1 Jun. 13, 2013

Related U.S. Application Data

(60) Provisional application No. 61/569,980, filed on Dec. 13, 2011.

(51) Int. Cl.
*A61G 3/00* (2006.01)
*A61G 3/08* (2006.01)
(Continued)

(52) U.S. Cl.
CPC .............. *A61G 3/0875* (2013.01); *G01L 5/00* (2013.01); *A61G 3/006* (2013.01); *G01L 5/0052* (2013.01); *A61G 3/0218* (2013.01)

(58) Field of Classification Search
USPC .......................................... 296/19, 20; 410/2
See application file for complete search history.

(56) References Cited

U.S. PATENT DOCUMENTS

| 3,412,628 A | 11/1968 | DeGain |
| 3,482,872 A | 12/1969 | Chamberlain |

(Continued)

FOREIGN PATENT DOCUMENTS

| JP | 1192353 A | 8/1989 |
| JP | 04-039437 | 10/1992 |

(Continued)

OTHER PUBLICATIONS

PCT International Search Report for Application No. PCT/US2012/069169 filed on Dec. 12, 2012.

(Continued)

*Primary Examiner* — H Gutman
(74) *Attorney, Agent, or Firm* — Warner Norcross & Judd LLP

(57) ABSTRACT

A fastening system includes an energy absorbing or impact indicator and at least one or more of the following: (1) a fastening base for mounting in an emergency vehicle, (2) a patient support engageable with a base, (3) a patient securement mechanism for securing a patient on a patient support, (4) a patient securement mechanism for securing a patient to a vehicle, (5) a patient support securement mechanism operable to secure a patient support in an emergency vehicle, or (6) a patient support securement mechanism operable to secure a patient support to a base, wherein the energy absorbing or impact indicator is located (1) at the patient securement mechanism, or (2) at the patient support securement mechanism, or wherein the energy absorbing or impact indicator is between (1) the base and the vehicle, (2) the patient support and the base, (3) the patient securement mechanism and the patient support, (4) the patient support and the emergency vehicle, (5) the patient and the emergency vehicle, or (6) the patient securement mechanism and the emergency vehicle, wherein the energy absorbing device or impact indicator has at least an energy absorbing state and a rigid state or indicates a level of impact at or between any of the respective component or components.

10 Claims, 12 Drawing Sheets

(51) Int. Cl.
    *G01L 5/00*     (2006.01)
    *A61G 3/02*     (2006.01)

(56)     References Cited

U.S. PATENT DOCUMENTS

| | | | |
|---|---|---|---|
| 3,583,530 A | 6/1971 | DeVenne | |
| 3,721,433 A | 3/1973 | Sobel | |
| 3,744,835 A | 7/1973 | Carbone et al. | |
| 3,752,526 A * | 8/1973 | Van Der Burgt et al. | 296/19 |
| 3,858,904 A | 1/1975 | Saxl | |
| 3,921,951 A | 11/1975 | Blok | |
| 3,973,650 A | 8/1976 | Nagazumi | |
| 4,023,652 A | 5/1977 | Torke | |
| 4,027,905 A | 6/1977 | Shimogawa et al. | |
| 4,178,032 A | 12/1979 | Hone | |
| 4,225,153 A * | 9/1980 | Bez et al. | 280/788 |
| 4,534,075 A | 8/1985 | Schnitzler | |
| 4,541,134 A * | 9/1985 | Black et al. | 5/118 |
| 4,579,381 A | 4/1986 | Williams | |
| 4,669,139 A * | 6/1987 | Richter, Jr. | 5/118 |
| 5,372,339 A | 12/1994 | Morgan | |
| 5,403,049 A | 4/1995 | Ebbinghaus | |
| 5,487,562 A | 1/1996 | Hedderly et al. | |
| 5,573,266 A | 11/1996 | Zalewski et al. | |
| 5,755,479 A | 5/1998 | Lavin et al. | |
| 5,971,489 A | 10/1999 | Smithson et al. | |
| 6,024,528 A * | 2/2000 | Taylor | 414/495 |
| 6,125,485 A | 10/2000 | Way et al. | |
| 6,193,297 B1 | 2/2001 | Vandermolen | |
| 6,231,095 B1 | 5/2001 | Chou et al. | |
| 6,527,263 B1 | 3/2003 | Verbrugge | |
| 6,564,409 B2 | 5/2003 | Metz et al. | |
| 6,735,794 B1 | 5/2004 | Way et al. | |
| 6,796,757 B1 | 9/2004 | Way et al. | |
| 6,874,819 B2 * | 4/2005 | O'Neill | 280/805 |
| 6,890,137 B2 * | 5/2005 | Hillberry et al. | 410/30 |
| 6,916,045 B2 * | 7/2005 | Clancy et al. | 280/805 |
| 7,389,552 B1 | 6/2008 | Reed et al. | |
| 7,549,690 B2 | 6/2009 | Bourgraf et al. | |
| 7,621,705 B2 * | 11/2009 | Hillberry et al. | 410/30 |
| 7,627,915 B2 | 12/2009 | Eriksson | |
| 7,775,574 B2 | 8/2010 | Matunaga et al. | |
| 8,413,942 B2 * | 4/2013 | Ward | 248/419 |
| 8,469,450 B2 * | 6/2013 | Wahls et al. | 297/344.17 |
| 8,585,004 B1 * | 11/2013 | Roeglin et al. | 248/421 |
| 8,616,604 B2 * | 12/2013 | Bourgraf et al. | 296/19 |
| 2003/0071472 A1 * | 4/2003 | Henderson et al. | 296/20 |
| 2005/0039965 A1 * | 2/2005 | O'Neill | 180/268 |
| 2005/0040631 A1 * | 2/2005 | Clancy et al. | 280/735 |
| 2008/0290679 A1 | 11/2008 | Lambarth et al. | |
| 2009/0165208 A1 | 7/2009 | Reed et al. | |
| 2009/0178200 A1 | 7/2009 | Lambarth et al. | |
| 2009/0222988 A1 | 9/2009 | Reed et al. | |
| 2011/0018296 A1 | 1/2011 | Broadley et al. | |
| 2011/0260482 A1 * | 10/2011 | Bourgraf et al. | 296/19 |

FOREIGN PATENT DOCUMENTS

| | | |
|---|---|---|
| JP | 08-047510 | 2/1996 |
| JP | 08-154975 | 6/1996 |
| JP | 2009080752 A | 4/2009 |

OTHER PUBLICATIONS

PCT Written Opinion for Application No. PCT/US2012/069169 filed on Dec. 12, 2012.

* cited by examiner

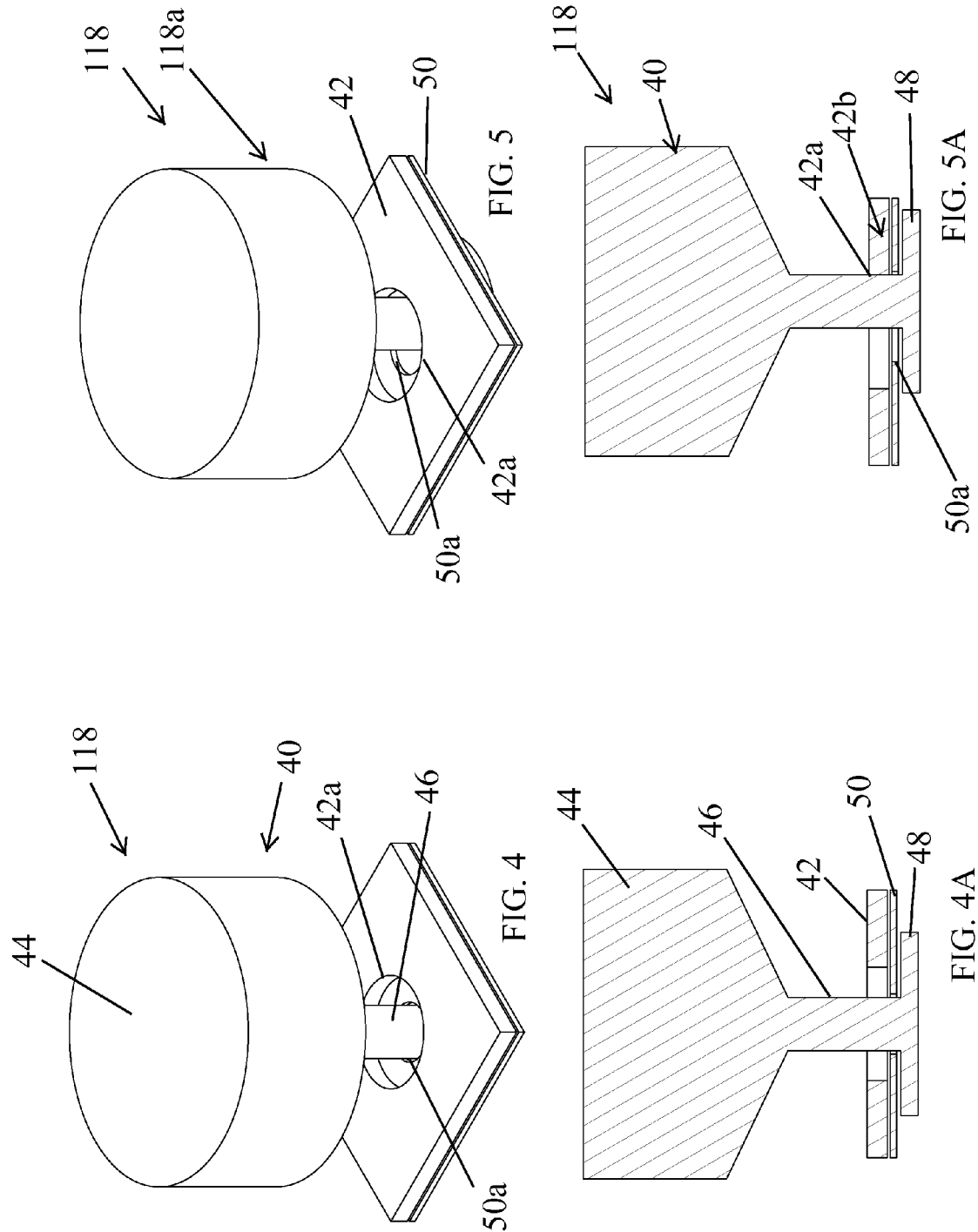

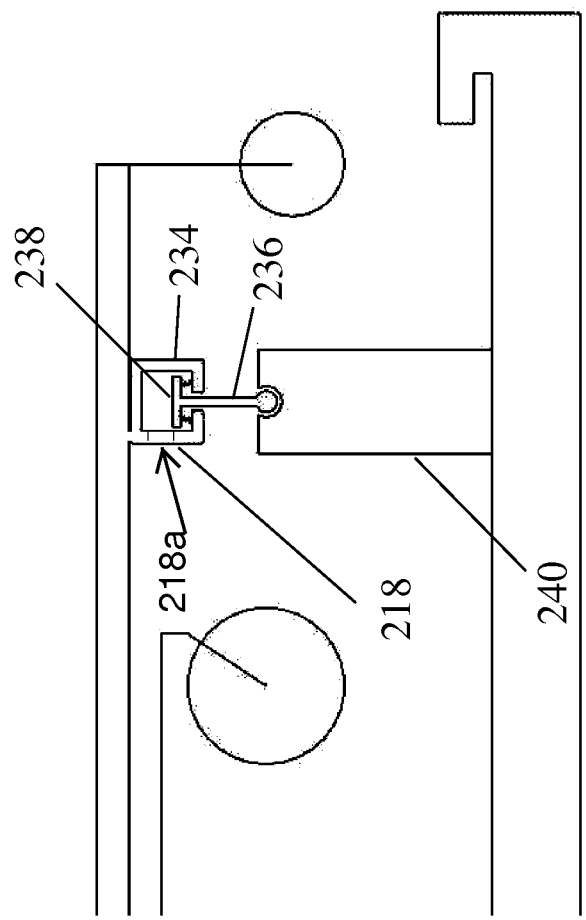

ENERGY ABSORBING FASTENING SYSTEM

The present application claims the benefit of an ENERGY ABSORBING FASTENING SYSTEM, Ser. No. 61/569,980, which is hereby incorporated by reference herein in its entirety.

TECHNICAL FIELD AND BACKGROUND OF THE INVENTION

The present invention generally relates to a fastening system, and more particularly to a fastening system for use in an emergency vehicle, such as a cot fastening system in an ambulance.

Cot fastening systems are typically rigid structures that keep the cot mounted in the emergency vehicle so that if the emergency vehicle suffers an impact, the cot will remain in the vehicle. To assure the safety of the patient, most countries have developed standards that ensure that the average patient is still retained by the system, even in the event of an impact. In the event of a peak impact, therefore, essentially all the energy is transmitted to the patient, the restraint system, and the cot. Therefore, it would be desirable to find a way to reduce the impact on the patient, the restraint system, and/or the cot but without compromising the integrity of the fastening system.

Further, when an emergency vehicle is involved in an accident or some sort of impact, the manufacture typically requires replacement of the cot, because without testing and/or inspection the manufacturer cannot guarantee that the cot will still function as it is designed. Cots are relatively expensive and, therefore, it would also be desirable to find a way to determine whether a cot has been subjected to an impact that exceeds a maximum acceptable magnitude.

SUMMARY OF THE INVENTION

Accordingly, the present invention provides a fastening system for a patient support, which absorbs some of the energy and/or optionally provides indication of whether the patient support, anchored by the fastening system, was subject to a damaging impact or not.

In one form of the invention, a fastening system includes a base for mounting in an emergency vehicle, a patient support engagable with the base, a patient restraint coupled to the patient support for securing a patient on the patient support, and an energy absorbing device or an impact indicator. The energy absorbing device or impact indicator is located (a) between the base and the emergency vehicle or (b) between the patient support and the base or (c) the patient securement mechanism and the patient support or (d) the patient support and the emergency vehicle or (e) between the patient and the emergency vehicle or at (a) a vehicle securement mechanism or (b) a patient support securement mechanism or (c) a patient securement mechanism.

In another form of the invention, a fastening system includes a fastening base having a vehicle securement mechanism to mount the fastening base in an emergency vehicle, a patient support engagable with the fastening base, and a patient support securement mechanism operable to secure the patient support to the base. The system further includes a patient securement mechanism or restraint coupled to the patient support for securing a patient on the patient support or to the vehicle, and an energy absorbing device or impact indicator at (a) the vehicle securement mechanism or (b) the patient support securement mechanism (c) the patient securement mechanism.

According to yet another form of the invention, a fastening system includes a base for mounting in an emergency vehicle, a patient support engagable with the base, a patient restraint coupled to the patient support for securing a patient on the patient support, and an impact indicator. The impact indicator may be located (a) between the base and the emergency vehicle or (b) between the patient support and the base or (c) between the patient securement mechanism and the patient support or (d) between the patient support and the emergency vehicle or (e) between the patient and the emergency vehicle, and indicates a level of impact on the patient support and/or the base.

In yet another embodiment, a fastening system includes a fastening base having a vehicle securement mechanism to mount the fastening base in an emergency vehicle, a patient support engagable with the fastening base, a patient support securement mechanism operable to secure the patient support to the base, and a patient restraint patient support for securing a patient. The system also includes an impact indicator at (a) the vehicle securement mechanism or (b) the patient support securement mechanism or (c) the patient securement mechanism, and wherein the impact indicator indicates a level of impact on the patient support and/or the base.

In yet another form, a fastening system includes a patient support for supporting a patient, a fastening base for securing the patient support to an emergency vehicle, and an energy absorbing device or impact indicator between the patient support and the patient or between the patient support and the fastening base.

According to another form of the fastening system, the system includes a fastening base for securing to an emergency vehicle and an energy absorbing device or an impact indicator at the base for coupling the base to the vehicle.

In yet another embodiment, the fastening system includes a patient support for transporting the patient, and an energy absorbing device or impact indicator at the patient support for connecting the patient support to the vehicle or interposed between a patient restraint and the patient support.

In any of the above systems, the energy absorbing device may have at least an energy absorbing state and a rigid state.

In any of the above systems, the patient support may comprise a cot, a wheelchair, an evacuation chair, stair chair, or evacuation sled or stretcher, or the like.

In any of the above systems, the impact indicator may have a first state and a second state, with the first state indicating no impact or an impact of a magnitude less than a designated impact, such as a maximum acceptable magnitude of impact, and the second state indicative of an impact of a magnitude exceeding the designated impact, such as the maximum acceptable magnitude of impact. The impact indicator may include one or more states between the first and second states, which correspond to magnitudes less than the designated magnitude of impact.

For example, the impact indicator may comprise a strain gauge, a scale combined with an accelerometer, or comprise a deformable or crushable member that when deformed or crushed indicates a certain level of impact. When said deformable or crushable member is deformed or crushed to a defined degree of deformation or compaction, the defined deformation or compaction may indicate when the magnitude of an impact exceeds a maximum acceptable magnitude of impact.

Optionally, the impact indicator may further include a stop at the maximum deformation or compaction.

In another aspect, the deformable or crushable member may comprise an elongatable member.

In any of the above systems, the energy absorbing device may include a deformable or crushable member, which when the deformable or crushable member is deformed or crushed to a maximum degree of deformation or compaction the deformable or crushable member is in rigid state in the direction of deformation or compaction. For example, the deformable or crushable member may comprise an elongatable member.

Accordingly, the present invention provides a fastening system that can absorb at least some of the impact energy that is transferred to a cot as a result of the impact associated with an ambulance.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 is an enlarged view of another embodiment of the energy absorbing device incorporating an impact indicator;

FIG. 4A is a cross-section view taken long line IVA-IVA of FIG. 4;

FIG. 5 is a similar view to FIG. 4 illustrating the impact indicator in a configuration that indicates the impact exceeds a maximum acceptable magnitude of impact;

FIG. 5A is a cross-section view taken along line VA-VA of FIG. 5;

FIG. 8 is a similar view to FIG. 7 illustrating the energy absorbing mechanism in a maximum impact absorbing position or stop configuration;

DETAILED DESCRIPTION OF THE PREFERRED EMBODIMENT

Figure 1:
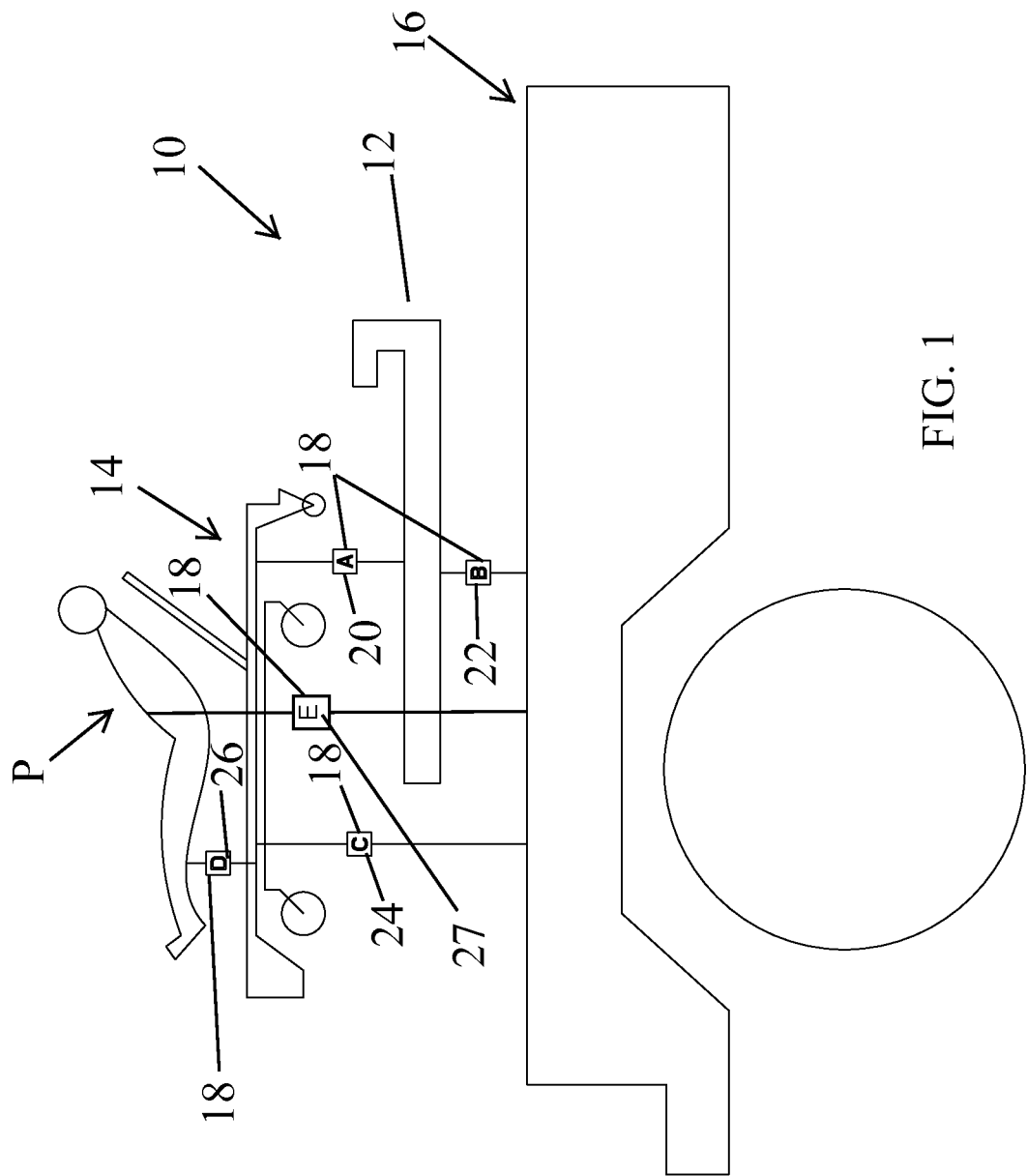
FIG. 1 is an exploded schematic view of one embodiment of a cot fastening system of the present invention.

Referring to FIG. 1, the numeral 10 generally designates a fastening system of the present invention. As will be more fully described below, fastening system 10 is configured to absorb energy when, for example, the vehicle in which the fastening system is mounted is subject to an impact, such as in a crash. Further, fastening system 10 may alternately or in addition incorporate an impact indicator to provide an indication of when such an impact exceeds a predetermined level, such as a predetermined acceptable maximum impact level or simply provides an indication of the level of impact, or the both.

Referring again to FIG. 1, in the illustrated embodiment fastening system 10 comprises a cot fastening system that includes a base 12 for securing a cot 14 in an emergency vehicle 16, such as an ambulance. For examples of suitable bases that may be used in system 10, reference is made to U.S. Pat. Nos. 6,796,757; 7,478,855; 7,540,547; 7,887,113, and copending application Ser. No. 12/886,987 filed Sep. 21, 2010 entitled AMBULANCE COT AND LOADING AND UNLOADING SYSTEM (STR03E P-269B); and Ser. No. 12/251,141 filed Oct. 14, 2008 entitled EMERGENCY STRETCHER (STR03E P-228), which are incorporated by reference in their entireties herein. For examples of suitable cots, reference is made to U.S. Pat. Nos. 6,125,485; 6,942, 226; 7,100,224; 7,124,454; 7,398,571; and 7,540,047, and also copending application Ser. No. 12/350,579 filed Jan. 8, 2009 entitled EMERGENCY STRETCHER (STR03E P-221A), which are all incorporated by reference in their entireties herein and all commonly assigned to Stryker Corporation of Kalamazoo, Mich. Although illustrated and described in the context of a cot fastening system, system 10 may be configured to fasten other patient supports, including, for example, a wheelchair, a stair chair, an evacuation sled or chair, or the like.

Referring again to FIG. 1, system 10 may incorporate one or more energy absorbing mechanisms 18 that absorb at least some of the energy during an impact, for example, when the ambulance in which system 10 is mounted has an accident. Energy absorbing mechanism 18 may be located in several positions around system 10. For example, energy absorbing mechanism 18 may be located between cot 14 and base 12 or between base 12 and vehicle 16 or between cot 14 and vehicle 16 or between the patient P and cot 14 or between the patient and the vehicle. For example, energy absorbing mechanism 18 may be incorporated into one or more securement devices, such as a securement mechanism 20 that secures cot 14 to base 12, or a securement mechanism 22 that secures base 12 to vehicle 16, or a securement mechanism 24 that secures cot 14 to the vehicle, or in a securement mechanism 26 that secures the patient to the cot (14), or in a securement device 27, such as a strap, that secures the patient directly to the vehicle. Alternately, the energy absorbing mechanism 18 may be simply positioned between the respective components and not necessarily incorporated into existing securement mechanisms.

Figure 2:
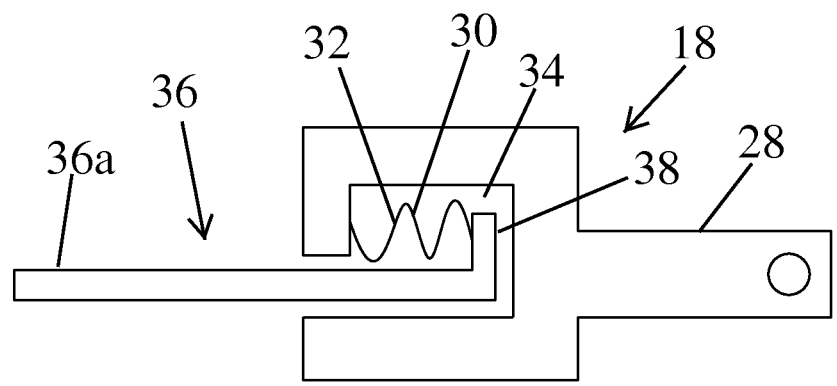
FIG. 2 is an enlarged view of an energy absorbing mechanism of the cot fastening system of FIG. 1.
Figure 3:
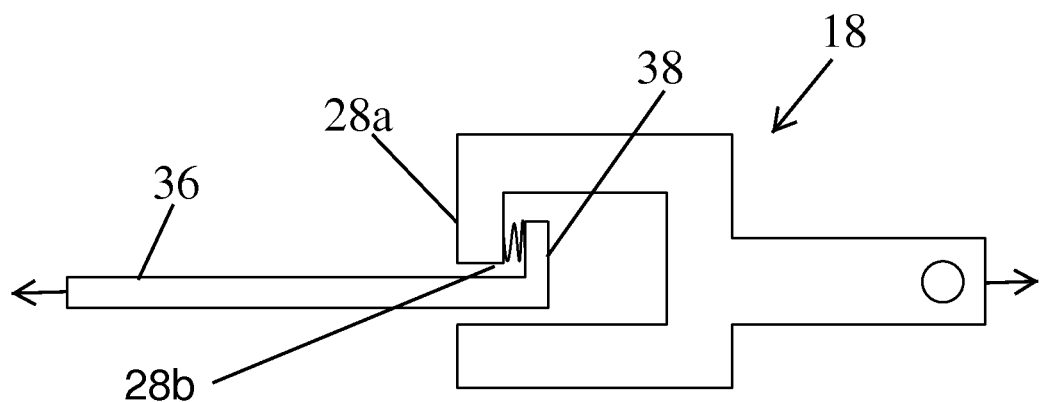
FIG. 3 is a similar view to FIG. 2 representing the energy absorbing mechanism in a fully activated state.

Referring to FIGS. 2 and 3, in the illustrated embodiment, energy absorbing mechanism 18 includes a bracket 28 for mounting directly or indirectly to any one of the base 12, cot 14, or vehicle 16. Bracket 28 incorporates therein an energy absorbing device 30, such as a deformable or crushable member 32, which is supported in a receptacle or compartment 34 formed or provided in bracket 28. Extending into receptacle 34 is a movable body in the form of an actuator arm 36, which includes on one end an engagement structure 38, such as a plate or flange, for engaging and compressing energy absorbing device 30 and on its opposed end a base 36a for either directly or indirectly coupling to the other component, for example, the cot, base, vehicle, or strap that forms the patient restraint. Thus, when arm 36 is pulled as a result of an impact (for example to the left as viewed in FIG. 2), the arm will compress and deform or crush member 32 until deformable or crushable member 32 is crushed or deformed to its most compressed state. When in its most compressed state, the crushable or deformable member (32) and bracket 28 will form a stop 28b to limit further movement of arm 36 and thereby define a fixed state for the respective securement mechanism. Optionally, engagement structure 38 and deformable or crushable member 32 may be joined or formed together so that when deformable or crushable member 32 is fully compressed, arm 36 together with bracket 38 form a strut that resists both tension and compression. Therefore, energy absorbing mechanism 18 has essentially at least two or more states, namely an energy absorbing state and a final rigid state, with a third state being defined as an initial state before there is an impact or before any significant forces are exerted on arm 36 or bracket 28. It should be understood that while it is described in reference to the arm moving relative to the bracket, the bracket may move relative to the arm.

As would be understood, energy absorbing device 30 may be provided without the above described bracket or compartment and therefore located between cot 14 and base 12 or between base 12 and vehicle 16 or between cot 14 and vehicle 16 or between the patient P and cot 14 or between the patient and the vehicle. For example, energy absorbing device 30 may be incorporated into one or more securement devices, such as a securement mechanism 20 that secures cot 14 to base 12, or a securement mechanism 22 that secures base 12 to vehicle 16, or a securement mechanism 24 that secures cot 14 to the vehicle, or in a securement mechanism 26 that secures the patient to the cot (14), or in a securement device 27, such as a strap, that secures the patient directly to the vehicle. Alternately, the energy absorbing device 30 may be simply positioned between the respective components and not necessarily incorporated into existing securement mechanisms.

Energy absorbing device 30, as noted, may comprise a deformable or crushable member or members. For example, the deformable or crushable member may comprise a member that elongates, such as a rod, including a metal rod.

Further, the energy absorbing device may be formed from a number of different materials, including soft steel, aluminum, and plastic, or a composite material, and have different configurations, such as a coiled wire or a honeycomb member or a rod, as noted above, or a combination of two or more of the above. Therefore, it should be understood that the energy absorbing device may have its energy absorbing characteristics formed by its material or its configuration, or a combination of both.

Additionally, the deformation may be elastic or plastic deformation. Further, the deformable or crushable member may comprise a single element or component or an assembly formed by several elements or components (for example see FIGS. 9-20). In addition, energy absorbing device 30 may be a separate component or may be integrated into the respective securement mechanism. For example, the securement mechanism may have a region or member with a reduced cross-section, which elongates under tension and therefore forms the energy absorbing device, but which elongation is limited by a stop mechanism or a bridging restraint, which provides a stop for any further elongation beyond a preselected maximum elongation to provide a controlled deformation or elongation, and further stops the deformation or elongation from progressing to failure.

In another example, the energy absorbing mechanism may be the patient restraint strap itself. For example, the strap may be formed from a material that stretches a specified percentage for a given tension applied on load.

The energy absorbing mechanism may also be used to provide an indication of the magnitude of the impact. For example, arm 36 of mechanism 18 shown in FIGS. 2 and 3 may have one or more markings along its length that correspond to a specified maximum acceptable magnitude of the impact to provide an indication of whether the impact is at or exceeds the maximum acceptable impact, and optionally, in addition, a measure of the impact magnitude.

As noted above, system 10 may incorporate an impact indicator into the energy absorbing mechanism. Referring to FIGS. 4-5A, the numeral 118 generally designates another embodiment of an energy absorbing mechanism that also incorporates an impact indicator. Similar to the energy absorbing mechanism described above, mechanism 118 includes a movable body 40, which is mounted in a base 42, which respectively mounts to either the patient support (for example the cot), the vehicle, the fastening base, the patient restraint base, or the patient restraint strap (e.g. the patient restraint strap that secures the patient of the cot or that secures that patient (and cot) to the vehicle. Body 40 includes an enlarged head 44 with a reduced neck 46 that extends through an opening 42a in base 42 and which is trapped in base 42 by a flange 48, which has a larger transverse dimension than opening 42a. Positioned between flange 48 and base 42 is a plate 50, such as a washer, which includes a transverse opening 50a through which neck 46 extends. Plate 50 is joined with base 42, for example by a weld (or welds) or an adhesive, which secures plate 50 to base 42. As best seen in FIGS. 4 and 5, circular opening 42a of base 42 has a larger diameter than neck 46 of body 40 and, further, a larger diameter than the opening 50a of plate 50, which defines the range of motion for the movable body as will be described below.

Optionally, plate 50 may be formed from a softer material or is thinner than base 42 so that when body 40 compresses against the edge of opening 50a, opening 50a will enlarge, such as shown in FIG. 5A, until the neck 46 reaches the edge of opening 42a at which point base 42 forms a stop 42b. As would be appreciated, plate 50 therefore forms the energy absorbing device, and base 42 forms the stop. Therefore it should be understood that mechanism 118 provides energy absorption in multiple directions.

Further, plate 50 may be configured, either by its cross-sectional properties, such as thickness, or material or a combination of both, so that when and if neck 46 reaches the edge of opening 42a, this is an indication that the impact exceeded a maximum acceptable magnitude. For example, plate 50 may be formed from a material that is as strong or stronger than the base and have the same thickness or greater thickness than base 42 and secured to base 42 with a connection that is designed to break. The connection may be design to break when the impact exceeds the maximum acceptable magnitude. As best understood from FIG. 5, when plate 50 is broken free from its connection to base 42, body 40 will move in opening 42a of base 42 until neck 46 abuts the edge of opening 42a, which provides the stop and prevents further movement of body 40 relative to base 42. Thus when neck 46 abuts the edge of opening 42a, it provides an indication that the impact exceeds the maximum acceptable magnitude.

Alternately, mechanism 118 may just be configured as an impact indicator 118a (and is not necessarily designed to absorb energy) so that it indicates when the ambulance in which system 10 is mounted experiences an impact, such as an impact from an accident, that exceeds the maximum acceptable magnitude. For example, the impact indicator may comprise a strain gauge, such as a load cell, a piezoelectric crystal, or an accelerometer in combination with a scale to indicate the level of acceleration all of which generate signals that can be processed by a processor mounted on the cot, the fastening base or in the vehicle cabin, for example, which then generates an indicia, visual or audible, to indicated either the level of impact or that a certain magnitude had been exceeded. Further, the processor may communicate with a memory device for storing the signals. Alternately, the impact indicator may comprise a series of sensors, for example mounted in a mat positioned under the wheels of the cot, that measure the pressure from the wheels of the patient support to provide a pressure mapping. Similarly, these signals can be processed by a processor to generate indicia and forwarded to a memory device for storage. Any of the above communication may be wired or wireless, and further be forwarded off the vehicle.

In this manner, mechanism 118 can provide an indication that the impact exceeds the maximum acceptable impact in any direction defined by base 42. It should be understood that the shape of body 40, base 42, plate 50, and/or flange 48 may be varied. Further, similar to the energy absorbing mechanism described above, mechanism 118 may be mounted between any one of the fastening base and the vehicle; between the cot and the fastening base; between the cot and the vehicle; between the patient restraint device and the cot; and between the patient and the vehicle, either as part of the securement device, or as a separate component. For example the head (44) of body 40 may be coupled to the fastening base (12), and base 42 may be fastened or otherwise incorporated into the cot.

Figure 6:
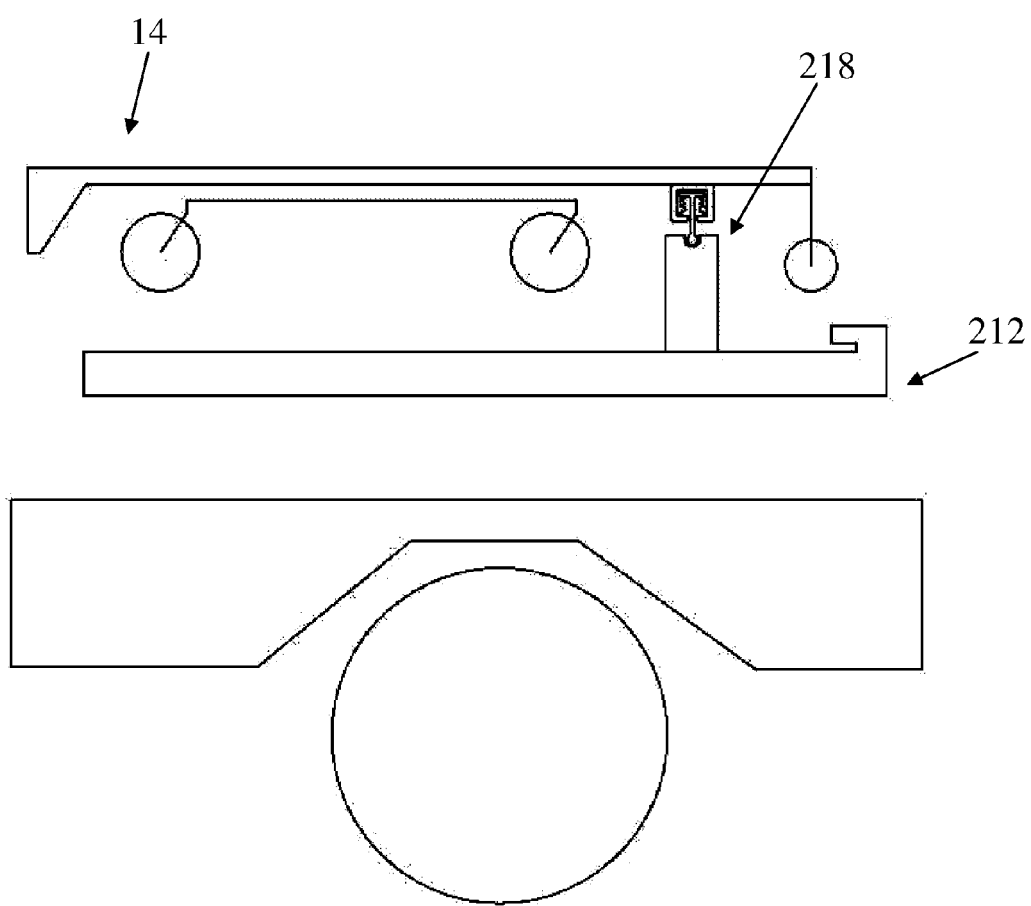
FIG. 6 is an exploded schematic view of another embodiment of the cot fastening system of the present invention incorporating another embodiment of an energy absorbing mechanism.
Figure 7:
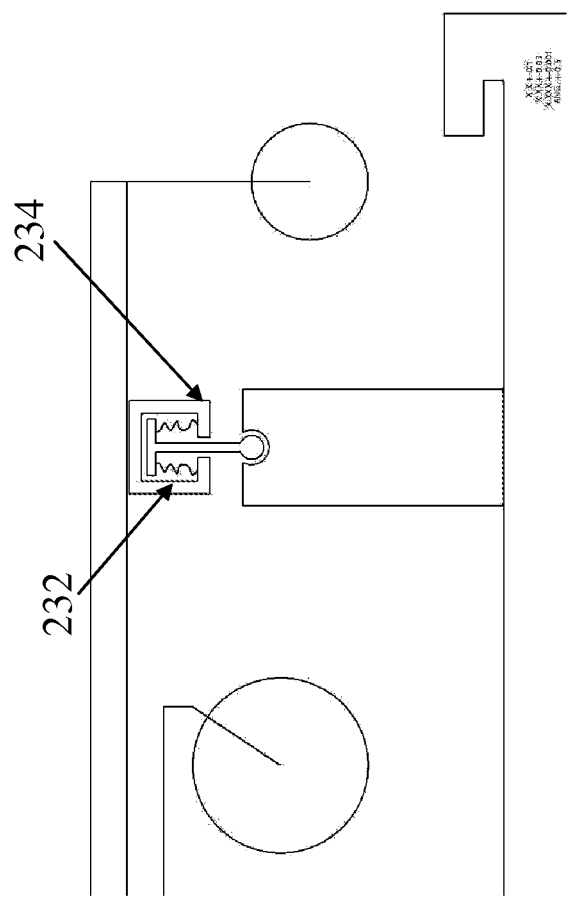
FIG. 7 is an enlarged view of the energy absorbing mechanism of FIG. 6.

Referring to FIGS. 6-8, the numeral 218 designates another embodiment of the energy absorbing mechanism of the present invention. In the illustrated embodiment, mechanism 218 is mounted between the cot (14) and the fastening base (12). Further, mechanism 218 includes a deformable or crushable member 232, which is housed in a casing 234, which mounts directly or indirectly to the underside of cot 14. A plunger 236 extends through the deformable or crushable member 232 and extends externally of casing 234 to couple directly or indirectly to the base 12. In the illustrated embodiment, the end of plunger 236 is mounted to an anchor 240, which then is mounted to base 12.

As best seen in FIGS. 7 and 8, plunger 236 includes an upper flange 238 on top (as viewed in the figures) of deformable or crushable member 232 so that when cot 14 lifts relative to base 12, plunger 236 will compress deformable or crushable member 232 by way of flange 238. Once deformable or crushable member 232 is fully compressed, plunger 236 and casing 234 form a rigid strut at least in the upward direction. Optionally, flange 236 and deformable or crushable member 232 may be integrated or joined so that when deformable or crushable member 232 is fully compressed, plunger 236 and casing 234 form a rigid strut in both directions (tension and compression). Similarly, mechanism 218 may incorporate an impact indicator—for example, a slot in the case through which one can see the flange, with a mark or marks along the edge of the slot to show if the flange has compressed the deformable or crushable member 232 to a preselected amount of compression that corresponds to the maximum acceptable impact, which could simply correspond to its fully compressed state or somewhere in between its uncompressed and fully compressed state.

Referring to FIGS. 9-20, the numeral 318 generally designates another embodiment of an energy absorbing mechanism of the present invention. In the illustrated embodiment, energy absorbing mechanism 318 is configured for placement between a cot and the fastening system. However, it should be understood that mechanism 318 may be mounted between the cot and the vehicle directly or may be incorporated into any of the aforementioned securement mechanisms.

Figure 10:
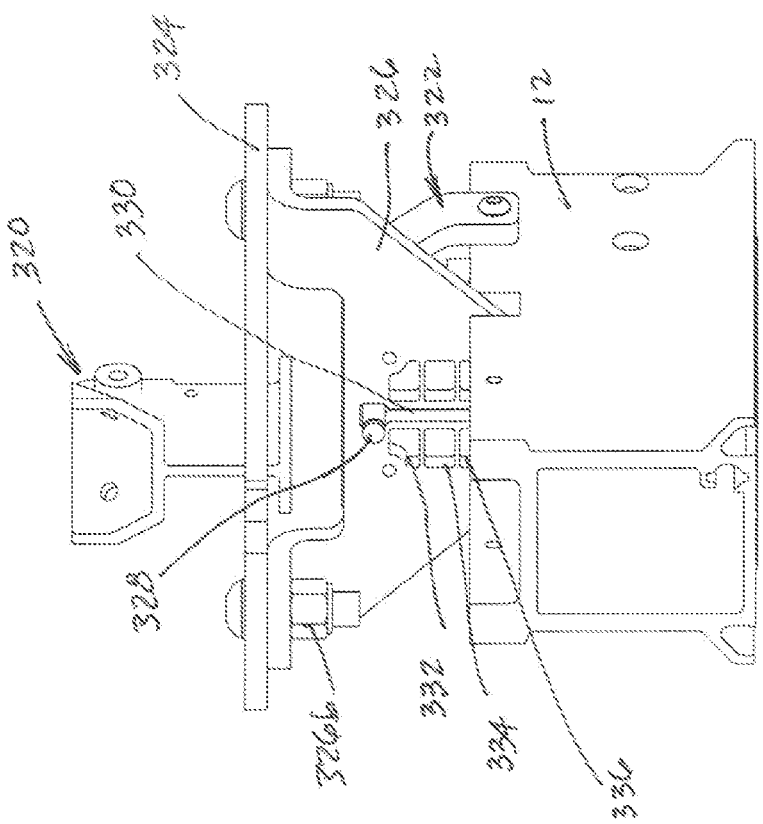
FIG. 10 is a similar view to FIG. 9 with one of the brackets removed for clarity.
Figure 9:
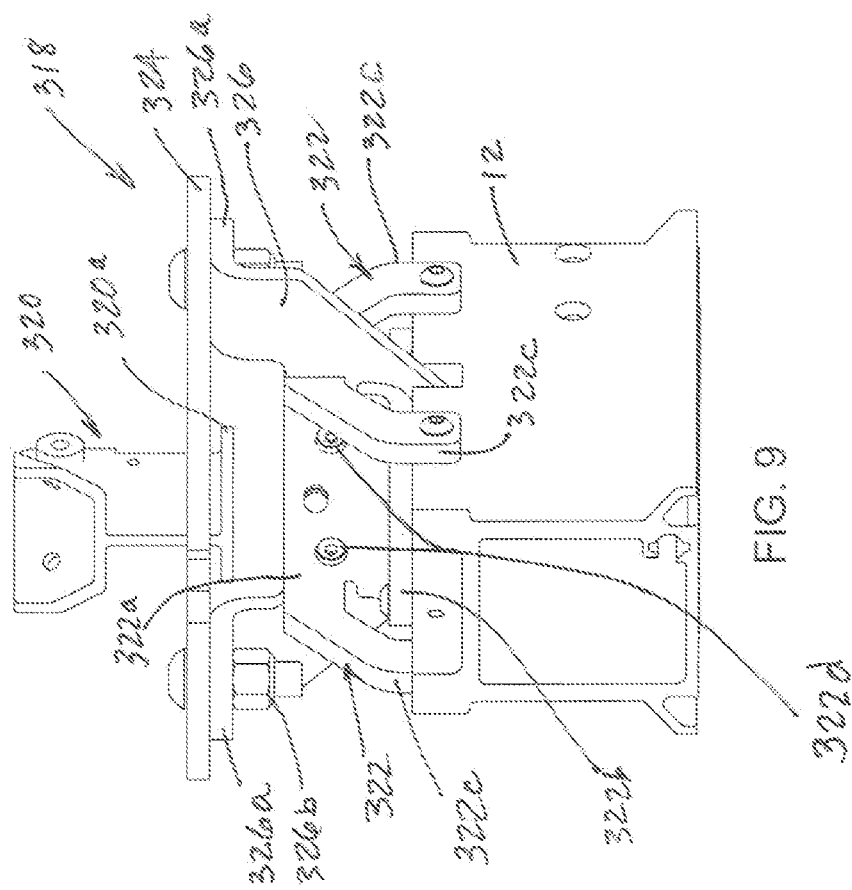
FIG. 9 is a perspective view of another embodiment of the energy absorbing mechanism according to the present invention.

As best seen in FIGS. 9 and 10, mechanism 318 includes a cot bracket 320 for securing mechanism 318 to a cot (14) and a pair of support brackets 322 for securing mechanism 318 to a base (such as base 12). Bracket 320 is extended through a mounting plate 324, which is coupled to support brackets 322 via a plate 326 configured to absorb energy. Plate 326 has a generally inverted U shape with mounting flanges 326a that mount to plate 324 by fasteners 326b, such as threaded fasteners, and a lower end 326c that extends into a slotted opening formed in base 12 (see FIGS. 13 and 14). Brackets 322 are secured to plate 326 by a pair of pins, described more fully below.

Figure 11:
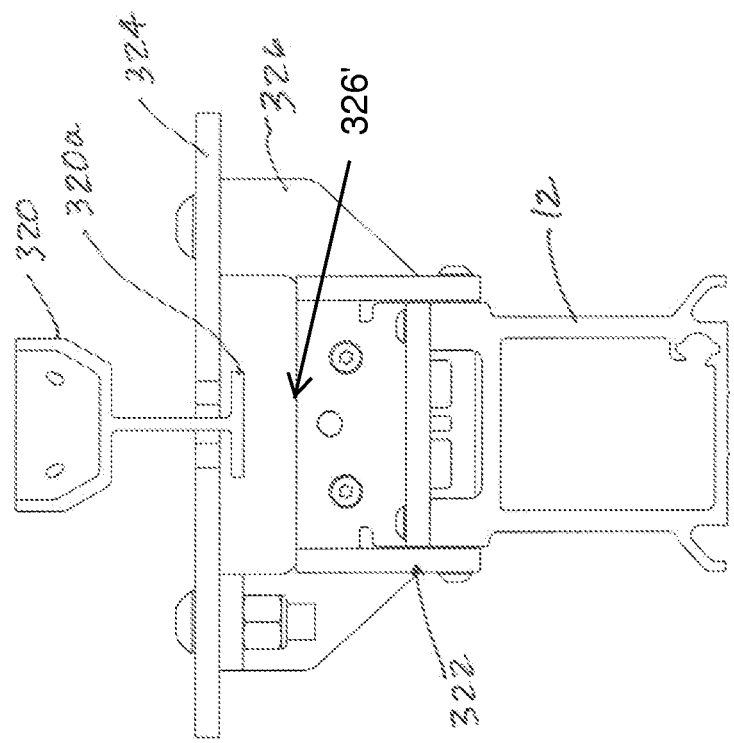
FIG. 11 is a front elevation view of the mechanism of FIG. 10.

The lower end of bracket 320 is captured in an opening in mounting plate 324 by an enlarged flange 320a so that when bracket 320 is raised, plates 324 and 326 will also be raised. But when bracket 320 is moved down, bracket 320 will translate downward relative to plate 324 until flange 320a of bracket 320 impacts plate 326, which will then acts a downward stop 326' (FIGS. 11 and 17). As will be more fully described below in reference to FIGS. 15-20, plate 326 includes one or more openings or regions of reduced thickness to form a crumple or deformation zone or zones so that when plate is lifted relative to base 12 (when the cot lifts, for example during impact), plate 326 will absorb at least some of the energy. Brackets 320, 322 and plates 324 and 326 may be formed from metal, a plastic material, or a composite or a combination of materials.

Figure 14:
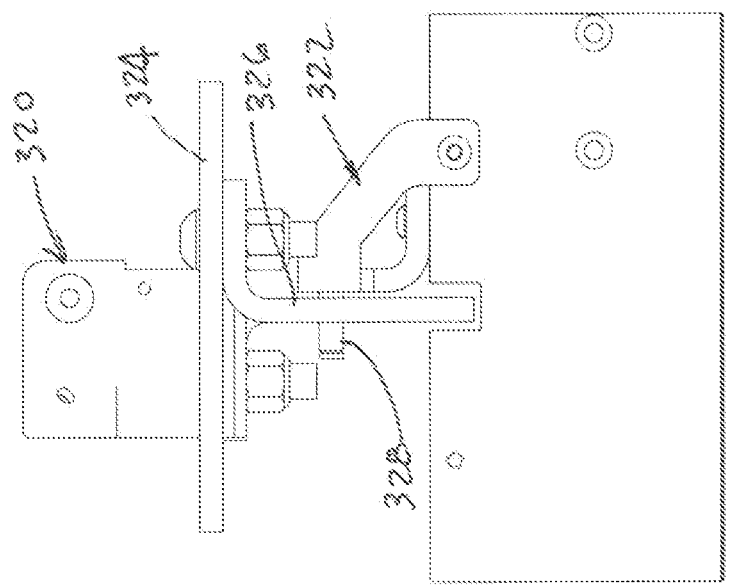
FIG. 14 is a similar view to FIG. 13 with a bracket removed for clarity.
Figure 13:
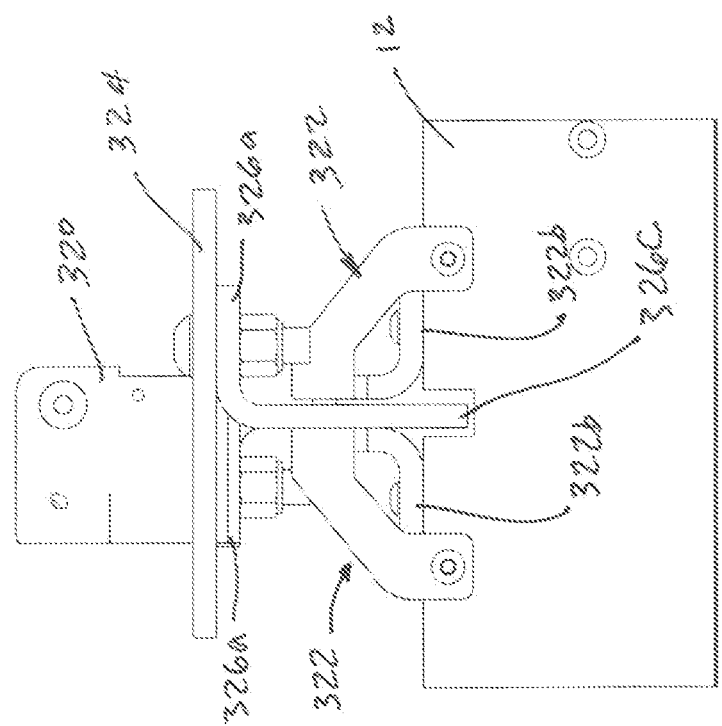
FIG. 13 is a side elevation view of the mechanism of FIG. 9.

Referring to FIGS. 13 and 14, brackets 322 are secured to base 12 by way of fasteners, such as threaded fasteners, or by welds. Further, each bracket 322 has a generally angle shape with a first leg 322a facing plate 326, a second leg 322b facing base 12, and a pair of extended legs 322c, which mount brackets 322 to base 12. First legs 322a of brackets 322 are optionally secured to plate 326 by pins or fasteners 322d, which are selected (by size or material) so that they will shear when the cot is subject to a preselected magnitude of impact.

Figure 12:
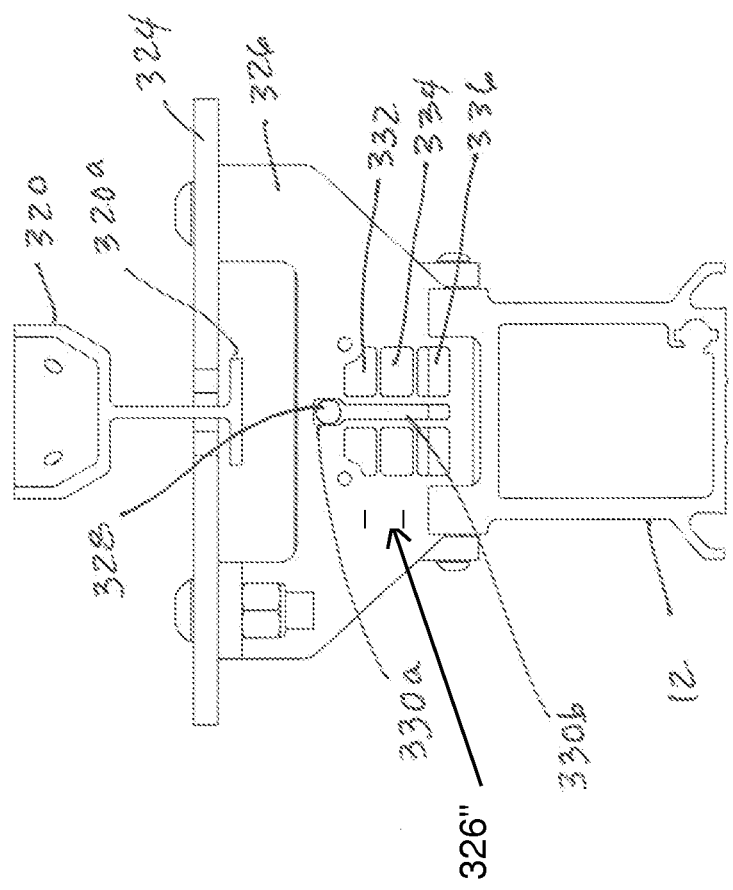
FIG. 12 is a similar view to FIG. 11 with the bracket removed for clarity.
Figure 16:
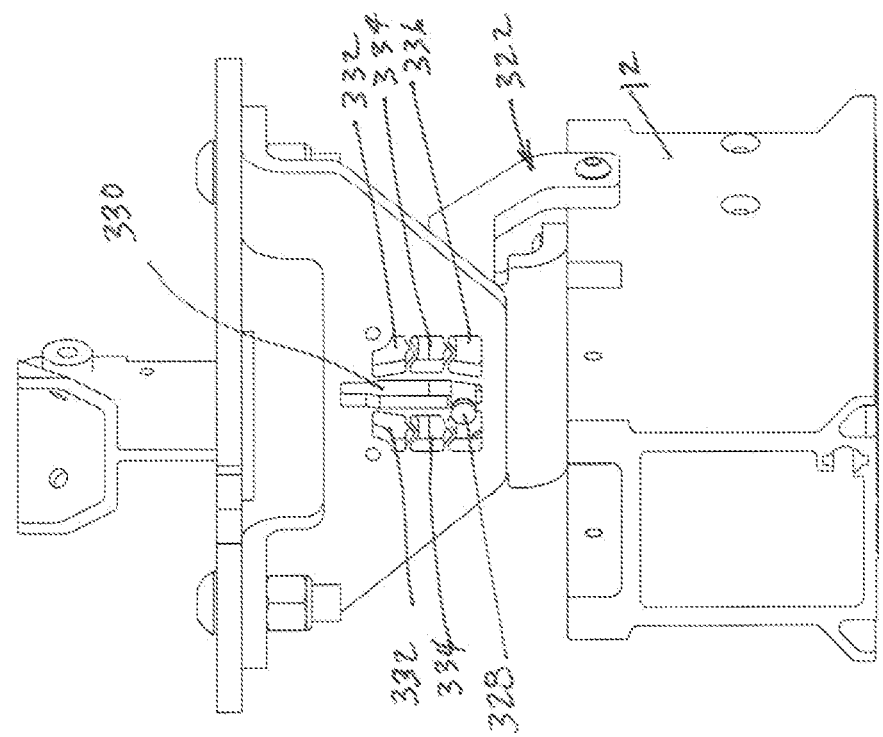
FIG. 16 is a similar view to FIG. 15 with the bracket removed for clarity.
Figure 15:
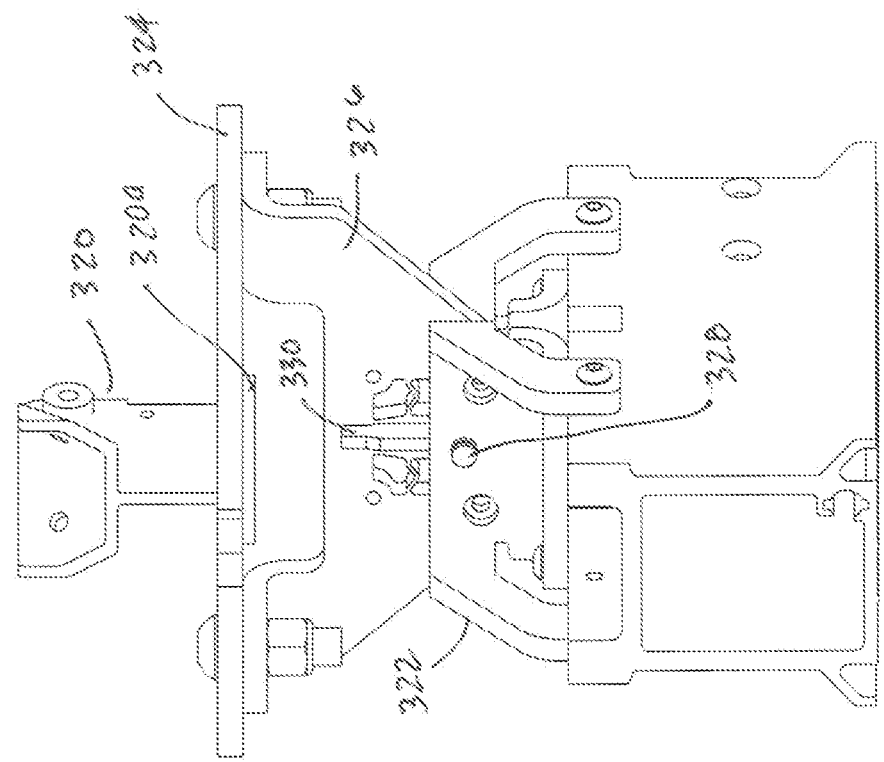
FIG. 15 is a similar view to FIG. 9 illustrating the energy absorbing mechanism in a fully activated state.
Figure 18:
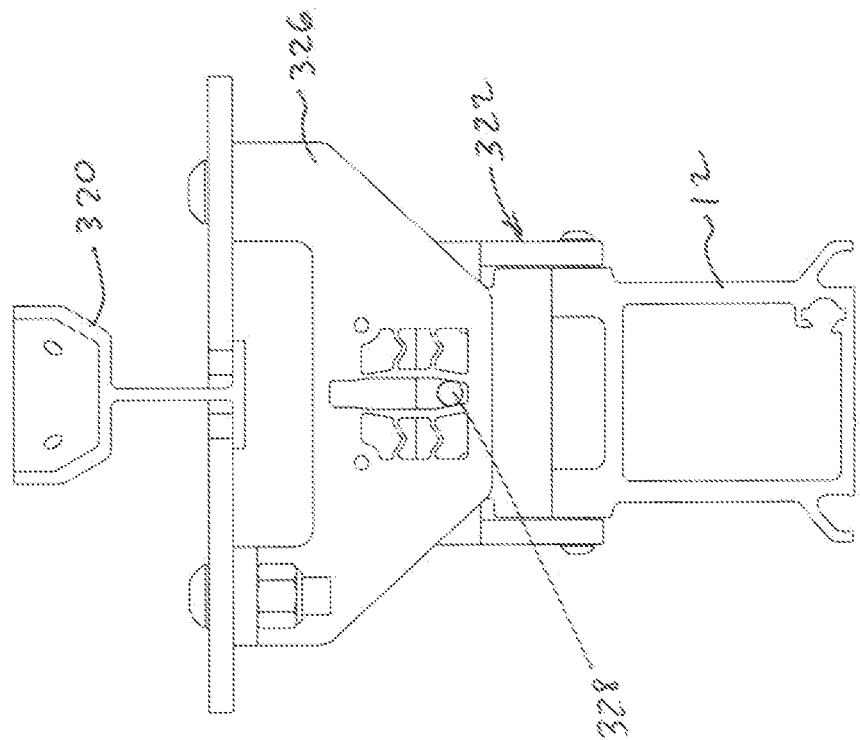
FIG. 18 is a similar view to FIG. 17 with the bracket removed for clarity.
Figure 17:
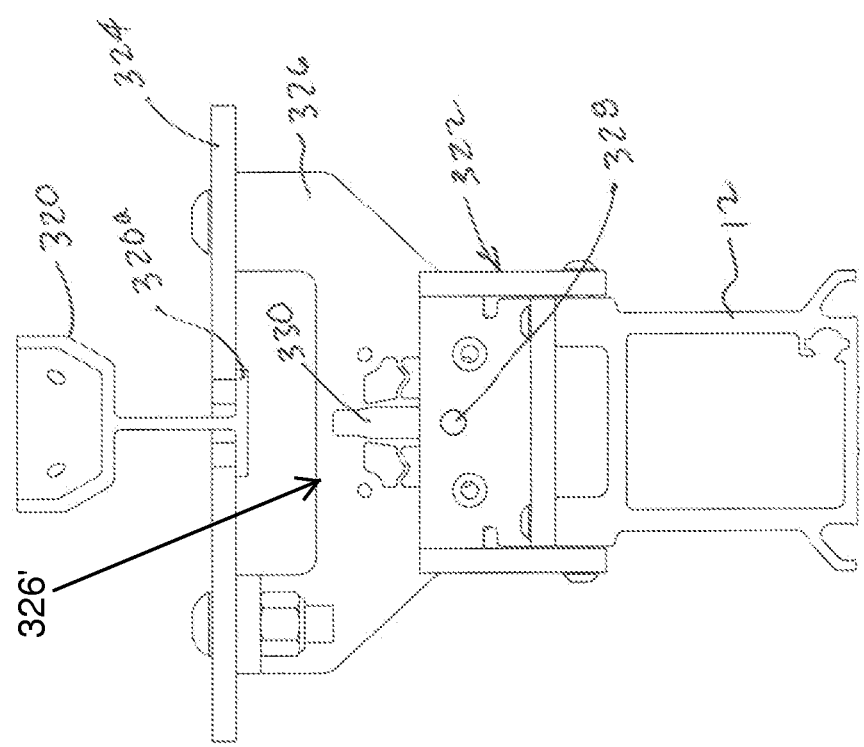
FIG. 17 is an elevation view of the mechanism in FIG. 15.
Figure 20:
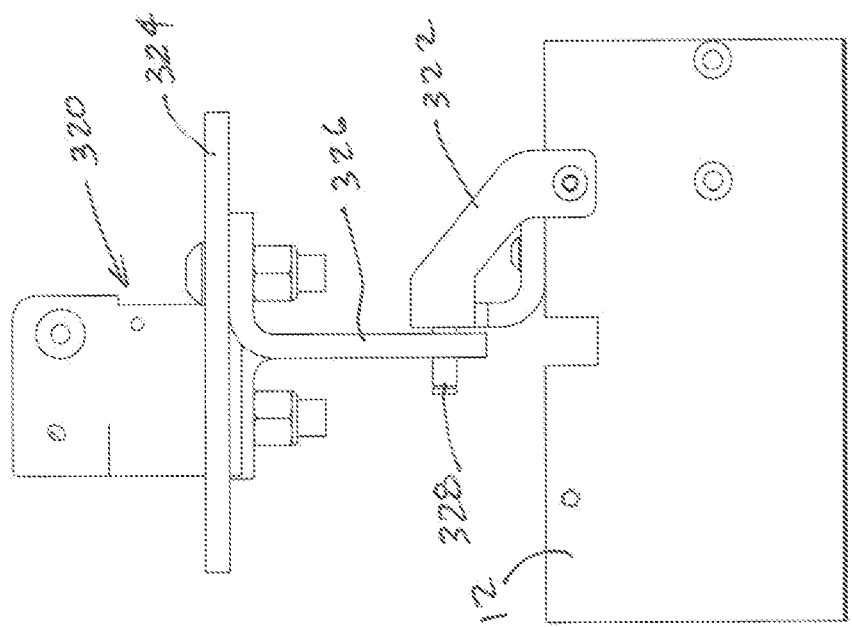
FIG. 20 is a similar view to FIG. 19 with the bracket removed for clarity.
Figure 19:
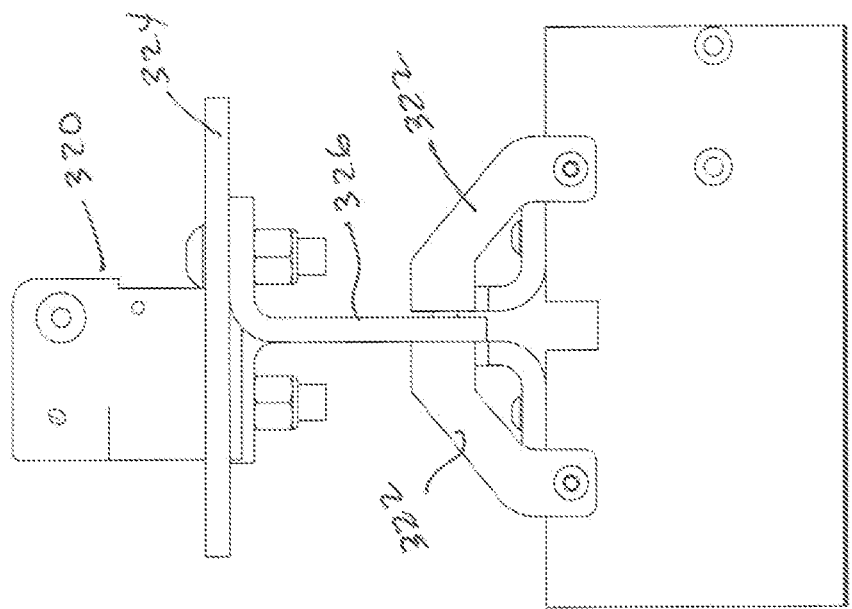
FIG. 19 is a side elevation view of the mechanism of FIG. 15.

As best understood from FIGS. 14 and 20, brackets 322 are also connected to plate 326 by a pin 328, which extends through a vertical slotted opening 330 in plate 326 (see FIGS. 10 and 16). Each end of pin 328 is supported by a respective bracket 322 as shown in FIGS. 9 and 13. Vertically slotted openings 330 includes an enlarged upper end 330a for receiving pin 328, which is best seen in FIG. 12. Enlarged end 330a opens into a narrowed lower portion 330b of slotted opening 330, which is straddled by one or more openings or regions of reduced thickness 332, 334, and 336 that extend through or into plate 326. As best understood from FIGS. 12 and 16, when bracket 320 is subject to an upward force, for example during an impact, bracket 320 will pull on enlarged plate 324, which in turn applies a tension force to plate 326, which is held in place by pins 322d and pin 328, which is captured in upper enlarged section 330a of slotted opening 330. However, after pins 322d shear (if used) and after the tension force exceeds the force needed to buckle or bend the regions adjacent slotted opening 330, plate 326 will move relative to pin 328 which continues to separate the margins of slotted opening 330 until reaching the lower end of slotted opening 330a. This interaction will create a drag on plate 326 and, therefore, form at least part of the energy absorbing characteristics of mechanism 318.

As will be understood, the size and shape and number of the holes or regions and the number and size and/or material of pins 322d can be varied to vary the energy absorbing characteristics of mechanism 318. Further, as described above in reference to the other embodiments of the energy absorbing mechanisms, mechanism 318 may also incorporate an indicator, such as demarcations 326" on plate 326, for example, adjacent the holes or regions, which when aligned with the upper edge of one of the brackets 322 can be used to designate a magnitude of impact or the like. Additionally, mechanism 318 may also incorporate or work in conjunction with any of the other types of indicators noted above.

In this manner, system 10 may provide a system to absorb energy through plastic and/or elastic deformation to reduce the impact on a patient and on the components of the system supported in an emergency vehicle, but without limiting the ability of the system to restrain the cot and person supported thereon in the vehicle even during an accident. Furthermore, the system or energy absorbing mechanism may incorporate an impact indicator to indicate to a manufacture whether the cot or fastening system has been subject to an impact with a magnitude of force that is not acceptable to the manufacturer.

While several forms of the invention have been shown and described, various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. Also, as noted above the system of the present invention may be used on other patient supports. Therefore, the present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which we claim an exclusive property or privilege are defined as follows:

1. A fastening system comprising:
   an energy absorbing device;
   a fastening base for mounting in an emergency vehicle;
   a patient support engageable with said base, said energy absorbing device being located between and coupling said patient support and said base; and
   said energy absorbing device configured and arranged to have an energy absorbing state where said energy absorbing device absorbs energy from at least one of said patient support and said base when subject to an impact force less than a predetermined impact force, and said energy absorbing device configured and arranged to have a rigid state where said energy absorbing device transfers energy between said patient support and said base when subject to an impact force that exceeds the predetermined impact force, and said energy absorbing device configured and arranged to remain operable to couple said patient support and said base in said energy absorbing state and said rigid state.

2. The system according to claim 1, wherein said energy absorbing device includes a deformable or crushable member, when said deformable or crushable member is deformed or crushed to a maximum degree of deformation or compaction in a direction of loading said energy absorbing device is in said rigid state in the direction of loading.

3. The system according to claim 2, wherein said deformable or crushable member comprises a crushable member.

4. The system according to claim 2, wherein said deformable or crushable member comprises an elongatable member.

5. The system according to claim 1, further comprising a vehicle, said base mounted in said vehicle.

6. A fastening system comprising:
   an impact indicator;
   a fastening base for mounting in an emergency vehicle;
   a patient support engageable with said base;
   said impact indicator being located between said patient support and said base; and
   said impact indicator including a deformable or crushable member that undergoes permanent deformation and indicates a maximum acceptable level of impact at or between said patient support and said base when the deformable or crushable member has been crushed or deformed to a predefined degree.

7. The system according to claim 6, wherein said impact indicator includes a first state and a second state, said first state indicating no impact or an impact of a magnitude less than a designated magnitude of impact, and said second state indicative of the maximum acceptable level of impact.

8. The system according to claim 7, wherein said impact indicator further includes a stop at said predefined degree.

9. The system according to claim 7, wherein said deformable or crushable member comprises an elongatable member.

10. The system according to claim 6, further comprising a vehicle, said fastening base mounted in said vehicle.

* * * * *